United States Patent [19]

Herron

[11] Patent Number: 4,773,264
[45] Date of Patent: Sep. 27, 1988

[54] PERMEABILITY DETERMINATIONS THROUGH THE LOGGING OF SUBSURFACE FORMATION PROPERTIES

[75] Inventor: Michael M. Herron, Danbury, Conn.

[73] Assignee: Schlumberger Technology Corporation, New York, N.Y.

[21] Appl. No.: 897,900

[22] Filed: Aug. 18, 1986

Related U.S. Application Data

[63] Continuation-in-part of Ser. No. 770,802, Aug. 29, 1985, Pat. No. 4,722,220, and a continuation-in-part of Ser. No. 656,104, Sep. 28, 1984, Pat. No. 4,712,424, and a continuation-in-part of Ser. No. 574,481, Jan. 26, 1984.

[51] Int. Cl.$^4$ .............................................. E21B 49/00
[52] U.S. Cl. ...................................... 73/152; 364/422
[58] Field of Search .................. 73/152, 153; 250/253, 250/256, 269, 270; 364/422, 498; 436/28

[56] References Cited

U.S. PATENT DOCUMENTS

| 4,475,038 | 10/1984 | Lochmann et al. | 250/270 |
| 4,495,604 | 1/1985 | Dumanoir | 367/25 |
| 4,594,887 | 6/1986 | Fertl et al. | 73/152 |

OTHER PUBLICATIONS

A. Timur, An Investigation . . . Sandstone Resevoirs, The Log Analyst, Jul.–Aug. 1968.

Primary Examiner—Jerry W. Myracle
Attorney, Agent, or Firm—David P. Gordon; David G. Coker

[57] ABSTRACT

Methods for determining the permeability of an earth formation traversed by a borehole are provided and comprise: logging the borehole to determine indications of at least a plurality of elements in the formation; determining the mineralogical content of the formation from the elemental indications; determining the porosity of the formation; and determining the permeability of the formation as a function of the determined mineralogical content and porosity. The mineralogical content of the formation is preferably determined according to a transform which relates elemental concentrations of the formation to mineral weight percentages. The permeability is preferably determined according to a transform which equates the permeability to a product of the function of the formation porosity, the maximum feldspar content in a given zone of the formation, and an exponential function of the summation of pedetermined mineral components of the formation and residual weighted by a redetermined constant for each mineral component and the residual. If desired, the element to mineral transform can be combined with the formation mineral and porosity to permeability transform, thereby eliminating the step of determining the mineralogical content via the element-mineral transform.

33 Claims, 5 Drawing Sheets

|     | KAOLINITE | ILLITE | FELDSPAR | QUARTZ | CALCITE | SMECTITE |
|-----|-----------|--------|----------|--------|---------|----------|
| Al  | 19        | 12     | 9.7      | x      | x       | 11       |
| Fe  | x         | 7.3    | x        | x      | x       | 1        |
| K   | x         | 4      | 12/7     | x      | x       | .5       |
| Si  | 22        | 23     | 30       | 47     | x       | 26       |
| Ca  | x         | x      | x        | x      | 40      | 2        |
| NON-POROUS |    |        |          |        |         |          |
| H   | 1.7       | .9     | x        | x      | x       | 3.9      |
| La  | 80        | 35     | x        | x      | x       | 30       |
| Th  | 27        | 17     | x        | x      | x       | 30       |
| U   | 6.7       | 4.5    | x        | x      | x       | 2        |
| Sc  | 23        | 20     | x        | x      | x       | 18       |
| V   | 120       | 220    | x        | x      | x       | 150      |

FIG. 2

PERMEABILITY DETERMINATIONS THROUGH THE LOGGING OF SUBSURFACE FORMATION PROPERTIES

This application is a continuation-in-part of application Ser. Nos. 770,802 now U.S. Pat. No. 4,722,220, 656,104 now Pat. No. 4,712,424, and 574,481 filed respectively on Aug. 29, 1985, Sept. 28, 1984, and Jan. 26, 1984. all three parent applications are hereby incorporated by reference herein.

BACKGROUND OF THE INVENTION

The present invention relates generally to investigating earth formations traversed by a borehole. More particularly, the invention relates to methods for determining the permeability of an earth formation traversed by a borehole from well logging data derived by lowering in the borehole one or more apparatus for investigating subsurface earth formations.

Because the permeability of a hydrocarbon bearing formation is a prime indicator as to whether the hydrocarbons may be produced, the oil industry has long been interested in developing a reliable and accurate permeability log. Over the years, a large number of permeability "transforms" have been developed which relate permeability to at least one other aspect of the earth formation. Thus, for example, it is sometimes found in certain formations that a correlation exists between the porosity of the formation and the logarithm of permeability of the formation according to the following relationship:

$$\log k - \log B_2 = -B_1 \phi \tag{1}$$

where k is the formation permeability, $\phi$ is the formation porosity, and $B_1$ and $B_2$ are empirical constants. If equation (1) was accurate and reliable, permeability could be determined on a continuous basis from logging tools as many different tools for and manners of deriving a porosity determination are known in the art. However, typically, the correlation provided by equation (1) is poor and not transferrable from zone to zone or oil field to oil field.

Other transforms which relate permeability to other formation parameters have also been proposed and are currently in use. Thus, A. Timur suggests in "An Investigation of Permeability, Porosity, and Residual Water Saturation Relationships", *Proceeding of 9th Ann. SPWLA Logging Symp.* June 23–26, 1968, Paper J, that an improved permeability estimate might be derived from a determination of porosity and residual water saturation according to the equation:

$$k = .136 \frac{\phi^{4.4}}{S_{wr}^2} \tag{2}$$

where k is the formation permeability, $\phi$ is the formation porosity, and $S_{wr}$ is the residual water saturation of the formation. While the standard error of the permeability estimate provided by equation (2) is only a factor of two (which is considered very good for this art), a determination of residual water saturation can only be made in the lab. Thus, borehole sampling techniques (e.g. coring) which are extremely costly and require extensive time delays would be required to use equation (2), and permeability from logging would not be realized. While the residual water saturation determination can be replaced by determinations derived from the free fluid index of the formation, the standard error rises precipitously. Thus, if nuclear magnetic resonance is used downhole to determine the free fluid index as is suggested by A. Timur, "Effective Porosity and Permeability of Sandstones Investigated Through Nuclear Magnetic Resonance Principles", *Proceedings of 9th Ann. SPWLA Logging Symp.*, June 23–26, 1968, Paper K, the standard error increases to a factor of between ten and twenty. Such an error factor, while competitive with other techniques available, is unacceptable in many situations.

Yet another permeability transform, known in the art as the Kozeny-Carman relationship, relates the permeability of a porous medium to the porosity and the surface area per unit volume of the solid matrix according to the equation:

$$k = \frac{A_1 \phi^3}{(1 - \phi)^2 S_o^2} \tag{3}$$

where k is the formation permeability, $\phi$ is the formation porosity, and $S_o$ is the surface area per unit volume of the solid formation matrix. Other forms of equation (3) exist which normalize the surface area to bulk volume and to pore volume. Nonetheless, all known forms of the equation still require borehole sampling techniques, and the expression is not measurable by borehole logging.

It is therefore an object of the invention to provide a reliable and accurate technique for determining the permeability of an earth formation through the use of logging tools.

It is a further object of the invention to provide reliable and accurate permeability determinations in an earth formation by using logging techniques to provide mineralogical information and porosity indications.

SUMMARY OF THE INVENTION

There are broadly provided, in accordance with the invention, methods for determining the permeability of an earth formation wherein information concerning the elemental content and the porosity of the earth formation is obtained, and the permeability of the formation is determined as a function of the elemental content and the porosity. The elemental content of the earth formation and the formation porosity are typically determined by processing well logging data derived by lowering in the borehole one or more apparatus for investigating subsurface earth formations.

The invention also provides methods for determining the permeability of an earth formation transversed by a borehole which comprises, logging the borehole to determine indications of at least a plurality of elements in the formation, determining the mineralogical content of the formation from the elemental indications, determining the porosity of the formation, and determining the permeability of the formation as a function of the determined mineralogical content and porosity. The porosity of the formation may be determined through standard porosity logging techniques. The mineralogical content of the formation is preferably determined according to the teachings of the above-referenced parent applications Ser. Nos. 770,802, 656,104, and 574,481. The permeability is preferably determined according to a relationship which equates the permeability to a product of a function of the formation porosity, the maximum feldspar content in a given zone of the formation, and an exponential function of the summation of predetermined mineral components of the formation and a residual component each weighted by a predetermined constant.

Additional objects and features of the invention will become more apparent to those skilled in the art upon consideration of the following detailed description of the invention when taken in conjunction with the accompanying drawings.

BRIEF DESCRIPTION OF THE DRAWINGS

FIG. 2 is a table which provides values for a matrix which defines relationships between selected minerals and elements.

DETAILED DESCRIPTION OF THE PREFERRED EMBODIMENTS

Figure 1A:
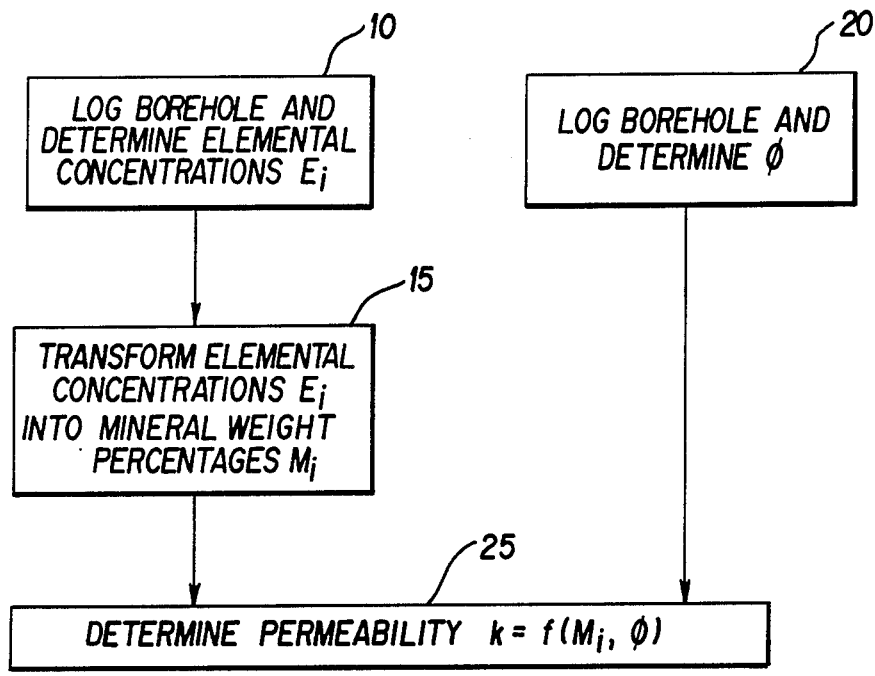
FIG. 1a is a flow diagram representing a manner of determining the permeability of an earth formation through logging.

Turning to FIG. 1a, a flow chart defining a method for determining the permeability of an earth formation is seen. At 10, a borehole traversing the earth formation is logging for at least one borehole depth by at least one borehole tool to determine the elemental concentrations of a plurality of elements. At 15, the elemental concentrations are converted via a transform into mineral concentrations, preferably according to any of the techniques disclosed in the parent applications hereto. At 20, the porosity of the formation for at least the one borehole depth is obtained, and at 25, the permeability is determined according to a relationship which relates the permeability to a function of the mineral contents and the porosity.

Examples of borehole tools which provide and determine elemental chemical data and yields as required by step 10 include natural gamma ray tools, induced gamma spectroscopy tools, high resolution spectroscopy tools, etc. The natural gamma ray tools typically comprise a scintillator and pulse height analyzer which respond to and measure the gamma ray activity due to the decay in an earth formation of the naturally radioactive elements thorium, uranium and potassium. The induced gamma ray spectroscopy tools typically utilize a pulse deuterium-tritium accelerator neutron source and sodium iodide detectors which detect the gamma rays resulting from the interaction of the source neutrons with the formation elements. As disclosed in U.S. Pat. No. 3,521,064 issued to Moran, and U.S. Pat. No. 4,055,703 issued to Antkiw, the spectroscopy tools can be run either in an inelastic, a capture, or an activation mode and can provide elemental yield information on at least hydrogen, chlorine, silicon, calcium, iron, oxygen, carbon, and sulfur. High resolution spectroscopy tools are based on the same principles as the induced gamma ray spectroscopy tools except that the accelerator neutron source may be replaced, if desired, by a chemical source, and the detectors utilized are high resolution (such as high-purity germanium) detectors. The high resolution spectroscopy tools may be used to determine both the amounts of the more abundant formation elements such as those determined by the induced gamma ray spectroscopy tools, and the amounts of less abundant element such as aluminum, vanadium, magnesium, manganese, titanium, sodium, etc. Those skilled in the art will appreciate that a variety of other borehole tools are known for obtaining elemental concentrations (e.g. a natural gamma ray tool followed by a chemical source followed by another natural gamma ray tool), and what is critical to the invention is the obtaining or gaining of the elemental indications or concentrations through borehole logging rather than the particular means or techniques used to obtain the results.

Methods for transforming elemental concentrations into mineral quantities as required by step 15 have been previously described by the instant inventor. In particular, three different techniques for accomplishing the same as disclosed in the parent applications hereto, Ser. Nos. 770,802, 656,104, and 574,481 which are incorporated by reference herein. While the preferred method, because of its simplicity, is that disclosed by Ser. No. 770,802, either of the other methods may be utilized and may on occasion provide improved results.

As disclosed in Ser. No. 770,802, elemental concentrations may be converted into mineral quantities via a transform which may take the form of a matrix. Thus, as seen in FIG. 2, a matrix table is presented which represents the relationship between various minerals and elements. The matrix of FIG. 2 may be used to provide mineral quantities (weight fractions) from the elemental concentrations determined at step 10 by multiplying the inverse of the matrix by the determined elemental concentrations. In this regard, it should be noted that the first six rows of numerical values in FIG. 2 represent a given element in a given mineral as a percentage figure. The remaining five rows are expressed in ppm. The double entry where the row for potassium and column for feldspar meet designates values for total feldspar and potassium-feldspar respectively. the "X" notations in FIG. 2 indicate that the percentages or ppm values are small (e.g. less than or equal to 10%) by comparison to the largest percentages or ppm values found in the column.

Figure 3:
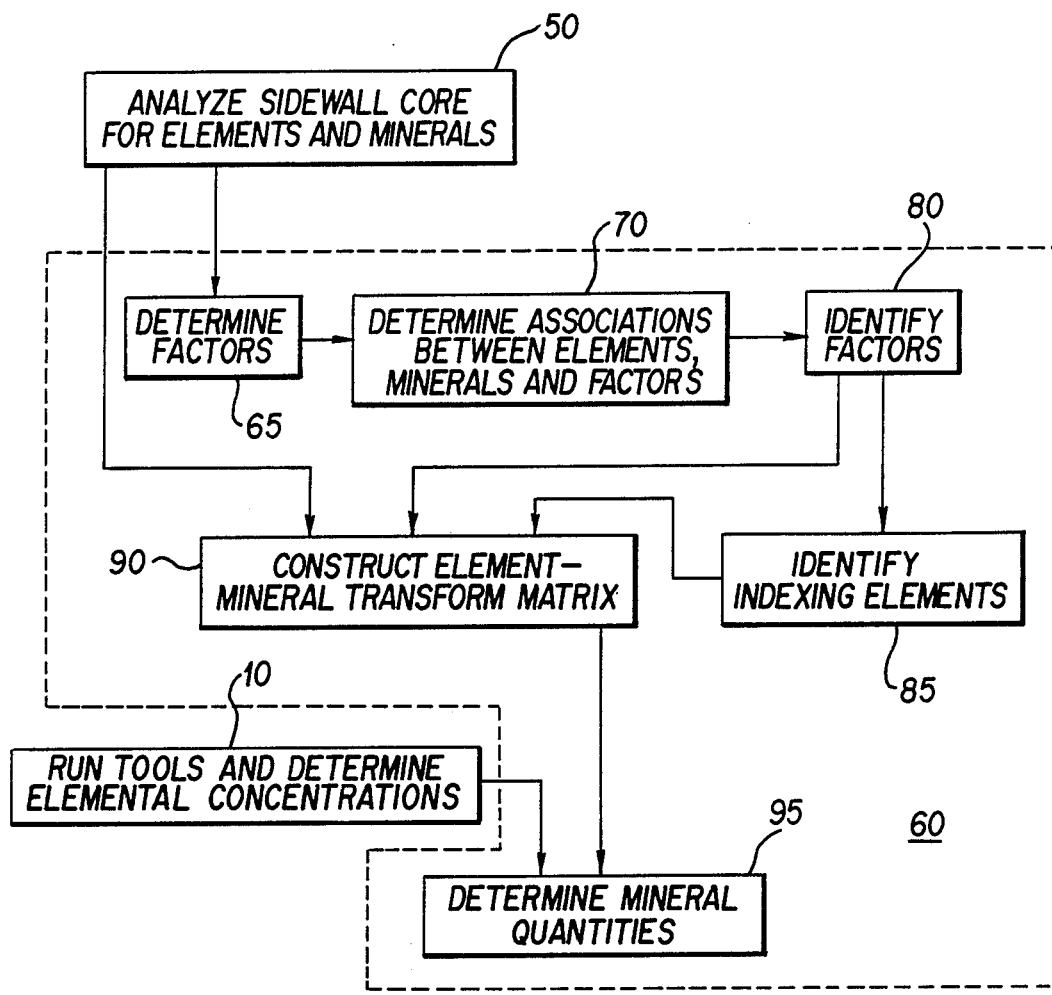
FIG. 3 is a flow chart that provides a method of determining matrix values which provide relationships between selected minerals and elements in a formation through logging a formation.

Another manner of determining mineral quantities from elemental concentrations is seen in FIG. 3 herein and taught by parent application Ser. No. 574,481. In essence, the values used in FIG. 2 or values similar thereto for determining mineral quantities from elemental concentrations may be derived according to the steps shown in FIG. 3. Thus, in accord with the steps of FIG. 3, if sidewall or whole cores from a well bore are available, the sidewall or whole cores are analyzed at 50 for elemental and mineralogical content via standard laboratory techniques such as X-ray diffraction, fines separation, instrumental neutron activation analysis, etc. Each sidewall core is then said to represent a complete data set of variables which includes a list of minerals and elements located therein and an absolute and/or relative concentration of the elements and minerals. The available information, preferably comprising numerous data sets, is input into a computer 60 (such as a VAX which is manufactured by Digital Equipment Corporation of Maynard, Mass.). The computer 60 is programmed in a manner so as to perform an r-mode factor analysis such as is described and listed in: Davis, John C., *Statistics and Data Analysis in Geology,* John Wiley & Sons, Inc. (New York, 1973). The r-mode factor analysis is used to reveal common sorces of correlation, if any, between the measured variables. Thus, at 65 the computer determines the major factors which account for a large percentage of the variance in the element and mineral measurements. Using measures of correlation also provided by the factor analysis between these factors and the element and mineral measurements, the computer determines at 70 the associations between the elements, minerals and factors. If desired, the computer may output factor cross-plots which have the factor correlation values of the factors (e.g. Factor 1 and Factor 2) as the axes, and the elements and minerals plotted as a function thereof.

Once the factors are determined by the computer at 65, it is perferable to identify the factors. Thus, a determination may be made at 80 by the computer as to whether any minerals in the formation have a close correlation to a factor. In some situations, a mineral may not correlate well with a single factor axis, but may correlate well with two factors. Preferably, dominant minerals such as illite, kaolinite, feldspar, quartz, calcite, smectite, etc. are identified with the factors at 80, and that identification may be accomplished by performing correlation value searches on the computer.

After the factors are identified at 80, indexing elements are chosen at 85 which can be used to establish a quantitative relationship between the elements and dominant mineral factors. The elements are preferably chosen at 85 by the computer and are chosen because of their correlation with the mineral which is to be quantified. If a mineral is well correlated with each of two factors, two elements are needed to index the mineral. One chosen index element should be correlated with one factor while the second should be correlated with the other factor. Again, a good correlation between the indexing element(s) and the mineral is desired and the existence of such correlations may be found by computer.

The core data analyzed at 50 is utilized in conjunction with the mineral factors and indexing elements at 90 to provide an element-mineral matrix $$[M]=[A]^{-1}\cdot E \qquad (4)$$

which transforms the concentration of the index elements into the weight percentage of the dominant factor minerals. [M] is the column matrix of mineral abundances. [E] is the column matrix of elemental concentrations in each sample. $[A]^{-1}$ is the inverse of the end member composition matrix having components which are the concentrations of each element in each mineral, the same being determinable through a multiple linear regression of the concentrations of index elements (chosen at 85) in conjunction with the mineral weight percentages gained from the sidewall or whole core analysis at 50. It will be appreciated that the required multiple linear regression and the determination of the elemental-mineral matrix are accomplished by computer, and many computer programs for accomplishing the same are available. An example of a multiple linear regression program is described and listed in: Davis, John C., *Statistics and Data Analysis in Geology,* John Wiley & Sons, Inc. (New York, 1973).

Once the elemental-mineral transform matrix is in place, the elemental concentrations determined at 10 from the logging tools are applied to the matrix so that mineral weight fractions may be determined at 95. Those skilled in the art will appreciate that the element-mineral transform matrix so obtained parallels the inverse of the matrix seen in FIG. 2. Indeed, the matrix of FIG. 2 was so derived from a plurality of sidewall cores from various formations.

Figure 4:
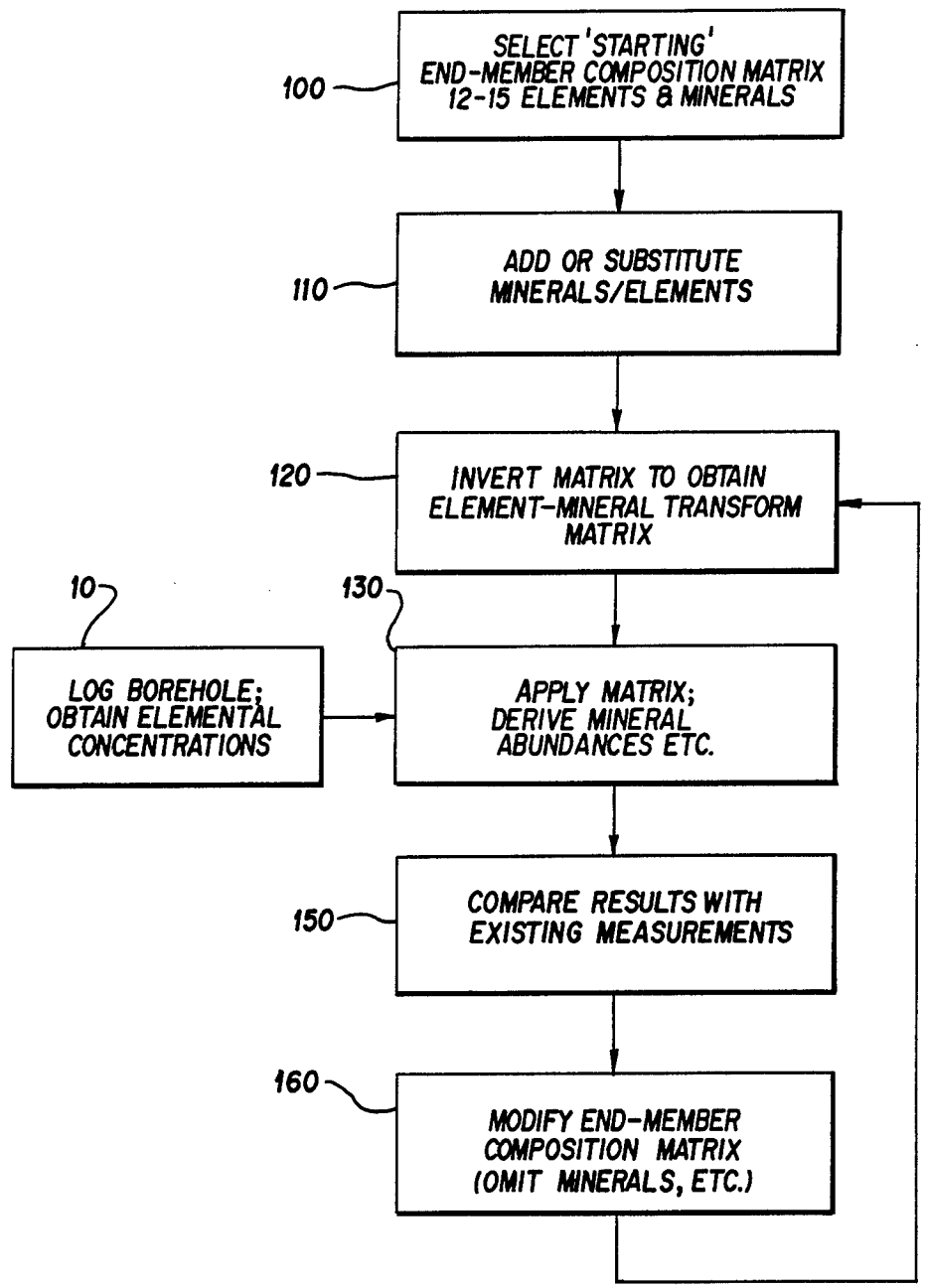
FIG. 4 is a flow chart which provides an alternative manner of deriving an element-mineral transform matrix.

A third technique for determining mineral quantities from elemental concentrations is seen in FIG. 4 herein and taught by parent application Ser. No. 656,104. This third technique can be explained in terms of the hypothesis of geochemical uniformity which states that the chemical composition of sedimentary minerals of the same degree of crystallinity is uniform, irrespective of the geographic origin of the minerals. Regardless, core samples and factor analysis are not required as in the technique of FIG. 3. Instead, a standard "starting" matrix relating a plurality (e.g. 12-15) index elements to a similar number of minerals known to occur on a widespread basis in formations of interest is constructed at 100 using the constant chemical formula for each mineral selected for inclusion. The quantities of each element in a given formula can be derived in a variety of ways known to those skilled in the art, such as measurement, regression analysis, or maximum entropy spectral analysis (see, e.g., the papers by I. Barrodale and R. E. Erickson in Geophysics, vol. 45 no. 3, March 1980 pp. 420–432 and pp. 433–446).

If desired, the choice of elements and minerals making up the starting matrix may be modified at 110 for a given oilfield on the basis of existing knowledge of the field. In most oilfields, the major mineral constituents are to some degree already known and recorded. Thus, additional or substitute minerals and elements can be incorporated into the matrix. This selection of elements and minerals may be further modified in light of data already available, for example to incorporate elemental concentrations which can be derived from existing logs, and because of practical considerations, such as difficulty of running specific logging tools in prevailing borehole conditions.

The matrix thus obtained is an end member composition matrix [A] as discussed in relation to equation (4). The required element-mineral transform matrix $[A]^{-1}$ is then obtained by inversion of the matrix [A] at 120 according to any of many matrix inverting computer programs known in the art.

Additional modifications to the matrix [A] may be made at 160 based upon a comparison made at 150 between other logging measurements with the results obtained by applying the element-mineral transform matrix at 140 to the elemental concentrations obtained by logging at 10. For example, an evaluation of thermal neutron capture cross-section which may be derived as a function of the mineral percentages and porosity (as taught in parent application Ser. No. 656,104) may be compared with a direct measurement of the same, and a good degree of correlation would help confirm that appropriate selections of minerals and elements had been made. Also, if any mineral in the starting matrix were evaluated as having zero concentration in a particular field, it could be concluded that that mineral was not significant in that field, and the matrix could be simplified, for that field, by removing that mineral from the matrix. The modified end-member matrix would be inverted at 120 and retested if desired to permit the definition of a working element-mineral transform matrix.

Different tools and methods for obtaining the porosity of the formations as required at 20 of FIG. 1 are also known in the art. Preferably, however, density tools such as the gamma-gamma FDC tool, or the Litho-Density tool (FDC and Litho-Density being trademarks of Schlumberger Technology Corp.) provide porosity by determining the bulk density of the formation. Details of the both tools and porosity determining techniques may be had by reference to U.S. Pat. No. 4,048,495 to Ellis, No. 3,864,569 to Tittman, and No. 3,321,625 to Wahl, all of which as assigned to the assignee herein. Thus, by assuming a fluid density (typically 1) and a matrix density average (typically 2.67), or by determining the field density according to various well known techniques and determining the matrix density via mineralogical analysis such as according to the teachings of parent application Ser. No. 574,481, the porosity can be determined according to:

$$\phi = \frac{\rho_b - \rho_{matrix}}{\rho_{fluid} - \rho_{matrix}} \quad (5)$$

where $\rho_{matrix}$ is the matrix density, $\rho_{fluid}$ is the field density, $\rho_b$ is the bulk density, and $\phi$ is the porosity. While the FDC and Litho-Density tools are preferred for obtaining porosity information, it is not intended that the invention be limited to those tools or manners of obtaining porosity. Those skilled in the art will appreciate that other tools such as neutron tools can provide accurate porosity indications, especially in formations which do not contain hydrous minerals.

Returning to FIG. 1, once the mineral quantities are determined at 15, and the porosity is determined at 20, the permeability of the formation is determined at 25 as a function of the mineral content and the porosity. More particularly, the permeability is preferably determined according to a relationship which equates the permeability to a product of a function of the formation porosity, the maximum feldspar content in a given zone of the formation, and an exponential function of the summation of predetermined mineral components of the formation and the residual mineral component each weighted by a predetermined constant. For example, the permeability k may be defined by:

$$k = C \cdot A_f \frac{\phi^3}{(1 - \phi)^2} \exp\left(\sum_i B_i M_i\right) \quad (6)$$

where $A_f$ is a function of a maximum fledspar content of a given zone, $B_i$ is a constant for each mineral component, $M_i$ is the weight fraction of each mineral component, $\phi$ is the porosity, and C is a constant. Preferably, $M_i$ includes a residual mineral weight fraction, and $B_i$ includes a weighting for the same.

For the preferred embodiment which requires the determination of the porosity, the maximum feldspar and the weight fraction (expressed as a decimal) of six minerals, the permeability k (in millidarcies) may be determined according to:

$$\log_{10} k = \quad (7)$$

-continued
4.9 + 2 (Maximum Feldspar) + 1 (Feldspar) +

.1 (Quartz) − 4.5 (Kaolinite) −

5 (Calcite) − 5.5 (Illite) −

7.4 (Smectite) − 5 (Residual) +

3 log$_{10}$(porosity) − 2 log$_{10}$(1 − porosity);

where the porosity is expressed as a decimal, and where the coefficients of the mineral weight fractions are the $B_i$ values of equation (6). It will be appreciated that the $B_i$ values and the coefficient for $A_f$ of equation (7) were derived from data obtained from a plurality of wells. It will also be appreciated that the value for $A_f$ is typically chosen to be the maximum feldspar value for the entire borehole. However, if there is reason to believe that a significant change in the maturity of the sediments has been located (i.e. the direction of the sediment source has changed, and a pronounced change in the porosity of the sand zones is found), respective maximum feldspar values for the zones above and below such a location may be obtained and used.

In order to derive the values for the coefficient of $A_f$, coefficients $B_i$, and the porosity function, core samples are preferably analyzed for their mineral contents, their porosity and their permeability. Then, a multiple linear regression analysis such as is described and listed in Davis, John C., *Statistics and Data Analysis in Geology*, John Wiley & Sons, Inc. (New York, 1973), is performed on a computer to provide the sets of coefficients and porosity functions that provide correlations between the expected and determined permeabilities. While different possibilities for the sets of coefficients and the porosity function may be presented by the computer, the preferred set and function is that which provides a logical relationship between the various variables and the permeability (which also varies over depth).

A logical set of coefficients and a logical porosity function for equation (6) may be determined by understanding the relationship between the physical nature of the formation and the formation's permeability. Thus, it is believed that for a given porosity, a maximum attainable permeability exists. Conditions favorable for maximum permeability include a predominance of quartz or quartz and feldspar (the B values for quartz and feldspar being positive as seen in (7)), combined with coarse grain size (affecting porosity) and maximum sorting. The sorting may be considered a function of the sediment which is reflected in the maturity of the relative feldspar abundance. Conditions unfavorable to permeability include the pore-bridging clays such as illite or smectite and cements such as calcite (the B values for illite, smectite, and calcite being negative as seen in (7)). Thus, a set of coefficients which might include a positive value for the $B_i$ of a clay or cement, or a negative coefficient for quartz or feldspar should typically be discarded, whereas the set of coefficients provided with equation (7) above, may be utilized because of their congruity with the physical expectations. Also, a porosity function, such as seen in equation (7), which is similar to the Kozeny-Carman equation (3) or other well-known equations is considered a logical possibility due to the researched nature of those equations.

While equations (6) and (7) are set forth as the preferred embodiment of the invention, those skilled in the art will appreciate that in the broadest sense, the invention is believed to be the discovery that permeability is related to both the formation porosity and the mineralogical content of the formation, and the realization that permeability may therefore be accurately derived via borehole logging. Thus, those skilled in the art, using the teachings contained herein, could provide other relationships between the porosity and formation minerals and the permeability which fall inside the invention. Indeed, with regard to equation (6), while it is believed that the maximum feldspar content does help fine tune the equation and provide improved results, such a variable is easily dispensible. Likewise, while the porosity function utilized in equation (6) is similar to the Kozeny-Carman relationship and is believed to be optimal, different porosity functions which also provide excellent results may be utilized. With regard to equation (7), and as discussed above, different values may be given to the $B_i$ coefficients, as well as the constant and the coefficient for the maximum feldspar content without deviating from the invention. In fact, if a few different minerals were used in the matrix of FIG. 2 to determine the mineralogical content of a formation (reflecting a different mineralogical analysis), the $B_i$'s for the remaining minerals would change. The $B_i$'s for the minerals would also change if different minerals were separated out by their degree of crystallinity. In light of all of the above, equation (7) should be viewed simply as providing the preferred minerals, coefficients and constant which correlate well to the obtained data and fit into the logical understanding regarding any relationship between formation minerals and the formation porosity. It is believed that equation (7) can be used in a universal manner to obtain accurate results.

Figure 1B:
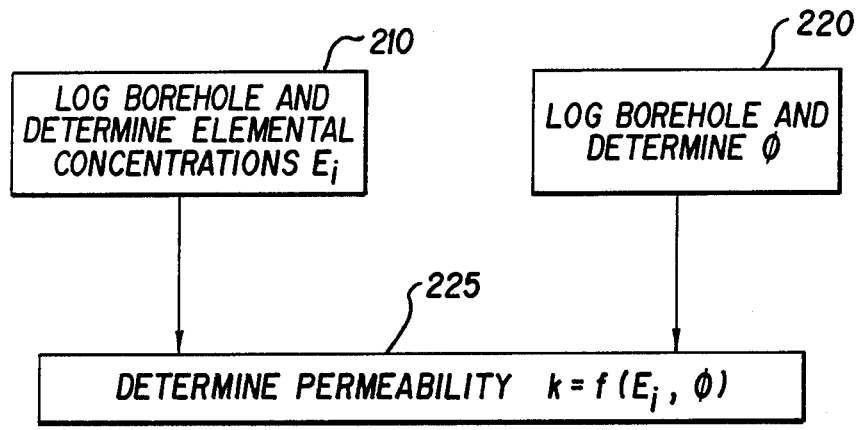
FIG. 1b is a flow diagram representing an alternative manner of determining the permeability of an earth formation through logging.

Turning to FIG. 1b, another embodiment for determining the formation permeability is disclosed in flow chart form. At 210 a borehole traversing the earth formation is logged for at least one borehole depth by at least one borehole tool to determine the elemental indications or concentrations of a plurality of elements. At 220, the porosity of the formation for at least the one borehole depth is obtained. At 225, the permeability is determined according to a relationship which relates the permeability of the formation to a function of the elemental concentrations and the porosity. Those skilled in the art will recognize that step 225 of FIG. 1b is simply a mathematical combination of steps 15 and 25 of FIG. 1a which include the transform of elements to minerals and the transform of minerals and porosity to permeability. While the resulting transform is of a much more complicated nature than the transform provided by equations (6) or (7), those skilled in the art will readily understand how to obtain the same, and will also appreciate that the transform would take the form of:

$$k = C' \cdot A'_K \frac{\phi^3}{(1-\phi)^2} \exp\left(\sum_i B'_i E_i\right) \quad (8)$$

where $A'_K$ is a function of the maximum potassium content of a given zone where the maximum potassium content is determined for all points where the aluminum concentration is below a predetermined constant, $B'_i$ is a constant for each elemental component, $E_i$ is the elemental concentration weight fraction of the elements of the formation, $\phi$ is the porosity, and $C'$ is a constant. Because the elements may be considered to be a linear combination of the minerals (and vice versa), equation (8) is in essence the equivalent of equation (6). Thus, those skilled in the art will also understand that the discussions provided above with regard to FIG. 1a (i.e. the obtaining of elemental and porosity data; the different forms of the transform; etc.) are equally relevant in practicing the invention disclosed by FIG. 1b.

Referring back to FIG. 1a, the method invention for determining the permeability of an earth formation was practiced on a borehole in California. Prior to logging the earth formation for elemental concentrations, values for coefficients $B_i$ for kaolinite, illite, smectite, K-feldspar, quartz and calcite, as well as a coefficient for $A_f$, and a value for a constant were determined by utilizing data sets from different boreholes (in Venezuela). Likewise, a transform relating the porosity and the mineral quantities of the formation with the permeability was derived through the use of the data sets and regression analysis. The transform determined was equation (7) above.

Figure 5:
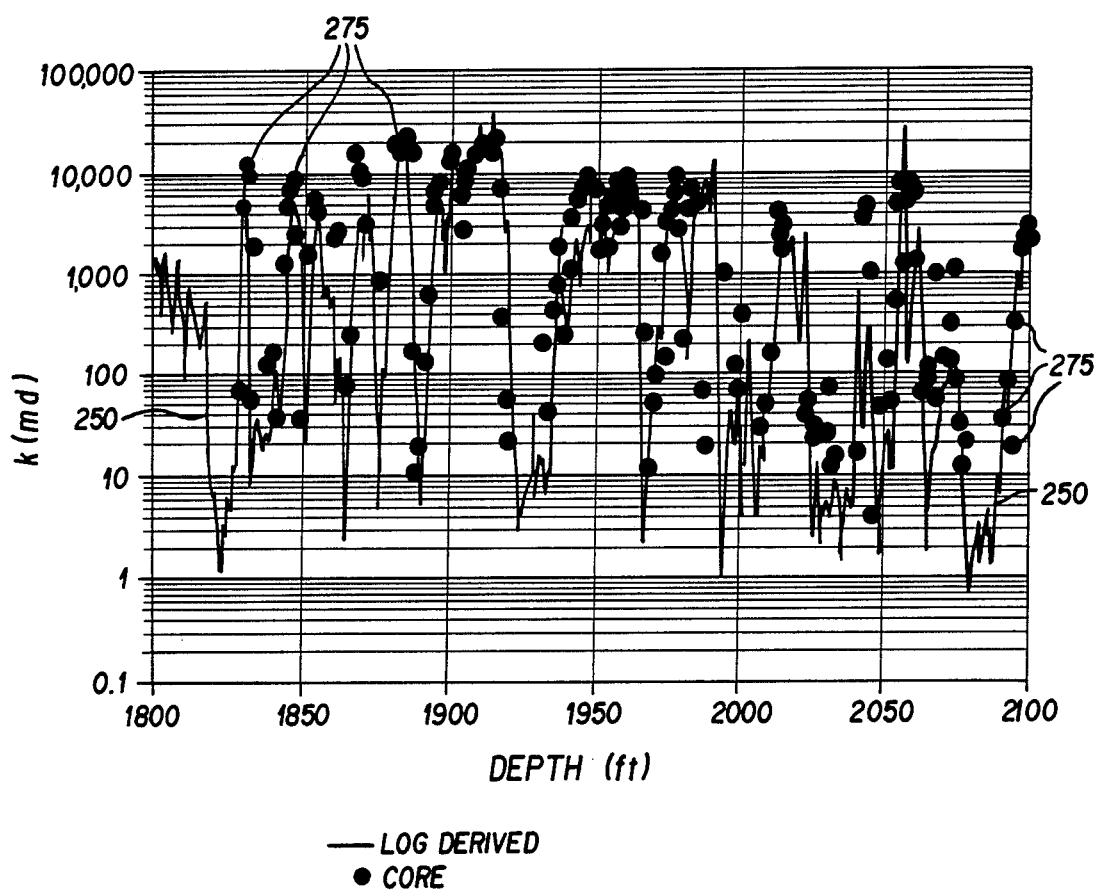
FIG. 5 is a permeability log depicting permeability measurements obtained from core samples superimposed on the mineralogically-derived permeability measurements of the invention.

After equation (7) was determined, the California borehole was logged with a gamma spectroscopy, tool, a natural gamma ray tool, a litho-density tool, and a compensated neutron tool. As a result of the logging, concentrations of thorium, iron, calcium, silicon, potassium, and non-porous hydrogen (rock) were determined over the length of the borehole, and porosity determinations were also made. The thorium concentration was used instead of an aluminum concentration because a tool for finding the aluminum concentration was not available. The determined elemental concentrations for each borehole depth investigated were then input into a matrix similar to the inverse matrix of that of FIG. 2, except that concentrations of aluminum, lanthanum, uranium, scandium, and vanadium were not provided. As a result of the matrix operation, mineral weight percentages were obtained, including a residual weight percentage. The maximum feldspar content was then obtained by scanning the obtained mineral weight concentrations over intervals of interest in the borehole. The mineral and residual weight percentages along with the porosity determinations for each borehole depth were then input into equation (7), and using the determined maximum feldspar content, the permeability along the length of the borehole was determined. A tangible record (log) of the permeability determinations along the length of the borehole was then generated as seen by the solid line 250 of FIG. 5. The permeability so derived is seen to be in good agreement over the broad range of four millidarcies to over twenty darcies with the permeabilities derived in laboratories on unpreserved core as represented by black circles 275. Indeed, the standard error between the log-derived and lab-derived permeability is only a factor of six where the cores and logs are presumed to be exactly on depth. The standard error decreases to a factor of two when a plus or minus two foot depth tolerance is allowed. Thus, the method invention proved to be capable of producing an accurate permeability determination directly from information gained through the logging of a borehole.

There has been described and illustrated herein methods in accordance with the present invention for determining from log data the permeability of an earth formation. While particular embodiments of the present invention have been utilized and described, it is intended that the invention be broad in scope and that the specifications be read likewise. Thus, while the terms "logs" and "logging" are utilized, they are not intended to be limiting in any manner. The terms are intended to encompass the gathering of data at a single depth station, multiple stations or during continuous movement of the tool, and to include all data processing and data transfer techniques known in the borehole logging arts. Also, while the invention was described as using a "transform matrix" for determining mineral weight percentages from elemental concentrations, other techniques such as simultaneous equations may be utilized in lieu of the matrix to accomplish the stated objectives and should be considered as an equivalent to the same. Moreover, while the invention was described as obtaining permeability from elemental concentrations, it will be appreciated that it is within the scope of the invention to use elemental indications (e.g. spectroscopy yields) and complicated transforms in lieu thereof. Likewise, while mineral weight percentages are preferably utilized, other indices of formation mineralogical content may be known and used.

Further, those skilled in the art will appreciate that the invention as described may be carried out in total by the logging tools of the art and computers of the art which are programmed according to well known programs for accomplishing statistical analysis. While an operator can provide additional or different information to the computer (e.g. a different element-mineral transform based on a knowledge of the formation; a different mineral and porosity to permeability transform; etc.), and thereby change the results obtained for a particular borehole, those skilled in the art should obtain similar results if the transforms provided (FIG. 2 and equation (7)) by the inventor herein are utilized with identical borehole tools. Of course, different borehole tools may be used to obtain the desired elemental concentration determinations. Therefore, it will be apparent to those skilled in the art that other changes and modifications may be made to the invention as described in the specification without departing from the spirit and scope of the invention as so claimed.

I claim:

1. A method for determining the permeability of an earth formation traversed by a borehole, comprising:
   (a) logging the borehole to determine indications of at least a plurality of predetermined elements in the formation;
   (b) from said elemental indications, determining a mineralogical content of the formation;
   (c) determining the porosity of the formation; and
   (d) determining the permeability of the formation directly as a function of the determined mineralogical content and porosity.

2. A method for determining the permeability of an earth formation according to claim 1, wherein:
   said mineralogical content of said formation comprises weight percentages of a plurality of minerals in said formation, and
   said permeability is determined at step (d) by:

$$k = f(\phi) \exp\left( \sum_i B_i M_i \right)$$

where k is the permeability in millidarcies f($\phi$) is a predetermined function of the porosity $\phi$ of the formation, $M_i$ are weight percentages in the formation of said plurality of minerals, and $B_i$ are predetermined weighting constants for said mineral weight percentages.

3. A method according to claim 2, wherein:
said permeability is determined at step (d) by:

$$k = \frac{\phi^3}{(1-\phi)^2} \exp\left( \sum_i B_i M_i \right).$$

4. A method according to claim 2, wherein one of said plurality of minerals is feldspar, further comprising:
   (e) determining a maximum feldspar content along a length of said borehole, wherein
said permeability is determined at step (d) by:

$$k = C \cdot A_f \frac{\phi^3}{(1-\phi)^2} \exp\left( \sum_i B_i M_i \right)$$

where $A_f$ is said maximum feldspar indication, and C is a constant.

5. A method according to claim 4 wherein:
said $M_i$ further include the weight percentage in the formation of residual minerals which are minerals other than said plurality of minerals of said mineralogical content determined from said elemental indications.

6. A method according to claim 4, further comprising:
   (f) generating a tangible record of said determined permeability along a length of said borehole.

7. A method according to claim 2, wherein:
said mineralogical weight percentages of said formation determined from said elemental indications are determined according to an element/mineral transform.

8. A method according to claim 7, wherein:
said element/mineral transform is a matrix relating a plurality of elemental indications to a plurality of mineral weight percentages, and said plurality of minerals for which mineral weight percentages are related in said matrix to said elemental indications include at least feldspar, kaolinite, illite, quartz, calcite and smectite.

9. A method according to claim 8, wherein:
said elemental indications comprise concentrations of a plurality of elements, and said elements for which concentrations are related in said matrix to mineral weight percentages include at least iron, potassium, silicon, calcium, and hydrogen.

10. A method according to claim 9, further comprising:
    (e) determining a maximum feldspar content along a length of said borehole, wherein
said permeability is determined at step (d) by:

$$k = C \cdot A_f \frac{\phi^3}{(1-\phi)^2} \exp\left( \sum_i B_i M_i \right)$$

where $A_f$ is said maximum feldspar indication, and C is a constant.

11. A method according to claim 2 wherein:
said $M_i$ further include the weight percentage in the formation of residual minerals which are minerals other than said plurality of minerals of said mineralogical content determined from said elemental indications.

12. A method according to claim 2, further comprising:
   (e) generating a tangible record of said determined permeability along a length of said borehole.

13. A method according to claim 1, further comprising:
   (e) determining an indication of formation maturity, wherein said permeability of said formation is determined as a function of said determined mineralogical content, said porosity, and said indication of formation maturity.

14. A method for determining the permeability of an earth formation traversed by a borehole, comprising:
   (a) logging the borehole to determine concentrations of at least a plurality of predetermined elements in the formation;
   (b) from said elemental concentrations, determining weight percentages of a plurality of minerals in the formation;
   (c) determining the porosity of the formation; and
   (d) determining the permeability of the formation directly as a function of the determined mineral weight percentages and porosity.

15. A method for determining the permeability of an earth formation according to claim 14, wherein: said permeability is determined at step (d) by:

$$k = f(\phi) \exp\left(\sum_i B_i M_i\right)$$

where k is the permeability in millidarcies, $f(\phi)$ is a predetermined function of the porosity $\phi$ of the formation, $M_i$ are said weight percentages of said plurality of minerals in the formation, and $B_i$ are predetermined weighting constants for said mineral weight percentages.

16. A method according to claim 15, wherein: said permeability is determined at step (d) by:

$$k = \frac{\phi^3}{(1-\phi)^2} \exp\left(\sum_i B_i M_i\right).$$

17. A method according to claim 15, wherein one of said plurality of minerals is feldspar, further comprising:
   (e) determining a maximum feldspar content along a length of said borehole, wherein said permeability is determined at step (d) by:

$$k = C \cdot A_f \frac{\phi^3}{(1-\phi)^2} \exp\left(\sum_i B_i M_i\right)$$

where $A_f$ is said maximum feldspar indication, and C is a constant.

18. A method according to claim 17, wherein: said mineralogical weight percentages of said formation determined from said elemental concentrations are determined according to an element/mineral transform relating said mineralogical weight percentages and said elemental concentrations, and said mineral weight percentages include weight percentages of at least feldspar, kaolinite, illite, quartz, calcite and smectite, and said elemental concentrations include concentrations of at least iron, potassium, silicon, calcium, and hydrogen.

19. A method according to claim 18 wherein: said $M_i$ further include the weight percentage in the formation of residual minerals which are minerals other than said plurality of minerals determined from said elemental concentrations.

20. A method according to claim 19, further comprising:
   (f) generating a tangible record of said determined permeability along a length of said borehole.

21. A method according to claim 15, wherein: said mineralogical weight percentages of said formation determined from said elemental concentrations are determined according to an element/mineral transform relating said mineralogical weight percentages and said elemental concentrations, and said mineral weight percentages include weight percentages of at least feldspar, kaolinite, illite, quartz, calcite and smectite, and said elemental concentrations include concentrations of at least iron, potassium, silicon, calcium, and hydrogen.

22. A method according to claim 21 wherein: said $M_i$ further include the weight percentage in the formation of residual minerals which are minerals other than said plurality of minerals determined from said elemental concentrations.

23. A method according to claim 22, further comprising:
   (e) generating a tangible record of said determined permeability along a length of said borehole.

24. A method according to claim 14, further comprising:
   (e) determining an indication of formation maturity, wherein said permeability of said formation is determined as a function of said determined mineral weight percentages, said porosity, and said indication of formation maturity.

25. A method for determining the permeability of an earth formation traversed by a borehole, comprising:
   (a) logging the borehole to determine indications of at least predetermined elements in the formation;
   (b) determining the porosity of the formation; and
   (c) determining the permeability of the formation directly as a function of said elemental indications and said porosity.

26. A method for determining the permeability of an earth formation according to claim 25, wherein: said elemental indications are elemental concentrations; and said permeability is determined at step (c) by $$k = f(\phi) \exp\left(\sum_i B'_i E_i\right)$$

where k is the permeability in millidarcies, $f(\phi)$ is a predetermined function of the porosity $\phi$ of the formation, $E_i$ are said elemental concentrations of said predetermined elements in the formation, and $B'_i$ are predetermined weighting constants for said elemental concentrations.

27. A method according to claim 26, wherein: said permeability is determined at step (c) by $$k = \frac{\phi^3}{(1-\phi)^2} \exp\left(\sum_i B'_i E_i\right).$$

28. A method according to claim 26, wherein two of said plurality of elements for which elemental concentrations are determined are potassium and aluminum, further comprising:
   (d) determining a maximum potassium concentration for all points where the aluminum concentration is below a predetermined constant along a length of said borehole, wherein
   said permeability is determined at step (d) by:

$$k = C' \cdot A'_K \frac{\phi^3}{(1-\phi)^2} \exp\left(\sum_i B'_i E_i\right)$$

where $A'_K$ is said maximum potassium concentration, and $C'$ is a constant.

29. A method according to claim 28, wherein: said elemental concentrations further comprise concentrations of at least iron, silicon, calcium, and hydrogen.

30. A method according to claim 29, further comprising:
   (e) generating a tangible record of said determined permeability along a length of said borehole.

31. A method according to claim 26, wherein: said elemental concentrations comprise concentrations of at least iron, potassium, silicon, calcium, and hydrogen.

32. A method according to claim 31, further comprising:
   (d) generating a tangible record of said determined permeability along a length of said borehole.

33. A method according to claim 25, further comprising:
   (d) determining an indication of formation maturity, wherein
   said permeability of said formation is determined as a function of said determined elemental indications, said porosity, and said indication of formation maturity.

* * * * *